(12) United States Patent
Bello et al.

(10) Patent No.: US 11,280,359 B2
(45) Date of Patent: Mar. 22, 2022

(54) NON-RETURN VALVE SYSTEM WITH ELECTRONIC CONTROL

(71) Applicant: Robert Bosch GmbH, Stuttgart (DE)

(72) Inventors: Felice Bello, Modena (IT); Francesco Dotti, Crevalcore (IT); Marcel Brucker, Suessen (DE); Paolo Ferraresi, Castelfranco Emilia (IT)

(73) Assignee: Robert Bosch GmbH, Stuttgart (DE)

( * ) Notice: Subject to any disclaimer, the term of this patent is extended or adjusted under 35 U.S.C. 154(b) by 150 days.

(21) Appl. No.: 16/749,614

(22) Filed: Jan. 22, 2020

(65) Prior Publication Data
US 2020/0271142 A1    Aug. 27, 2020

(30) Foreign Application Priority Data
Feb. 22, 2019 (IT) .................. 102019000002599

(51) Int. Cl.
| F15B 13/02 | (2006.01) |
| F15B 20/00 | (2006.01) |
| F16K 17/24 | (2006.01) |
| F16K 31/04 | (2006.01) |

(52) U.S. Cl.
CPC .......... *F15B 20/005* (2013.01); *F15B 13/023* (2013.01); *F16K 17/24* (2013.01); *F16K 31/046* (2013.01)

(58) Field of Classification Search
CPC ............................ F15B 13/023; F15B 20/005
See application file for complete search history.

(56) References Cited

U.S. PATENT DOCUMENTS

| 4,278,011 A | 7/1981 | Parquet |
| 5,207,059 A | 5/1993 | Schexnayder |
| 6,293,181 B1 | 9/2001 | Hajek, Jr. et al. |
| 8,291,934 B2 * | 10/2012 | Gehlhoff ............... F15B 11/006 137/596.18 |

(Continued)

FOREIGN PATENT DOCUMENTS

| AU | 2009101163 A4 | 12/2009 |
| CN | 109139613 A | 1/2019 |
| DE | 10 2014 204 070 A1 | 9/2015 |

(Continued)

OTHER PUBLICATIONS

"Compact Excavator Pipe-Rupture Valve—Series CFS," Reference: 300-P-9050076-E-03/11.2009, Bucher Hydraulics, 2009 (11 pages).

(Continued)

*Primary Examiner* — F Daniel Lopez
(74) *Attorney, Agent, or Firm* — Maginot, Moore & Beck LLP

(57) ABSTRACT

A valve unit includes a first piston, which has a first opening and a control chamber. A fluid connection between a first and a second port is closed or, in a position defined by the first piston, is held open in the event that a hose which is connected to the first port bursts. A pilot valve (48) is present, which has a core and a coil, and a fluid flow from the control chamber to the first port can be regulated by an electric current in the coil. The current is regulated by a logic unit which is suitable for receiving signals from at least one sensor, in particular a pressure sensor, an inertia detector and/or position sensor and for regulating the electric current in the coil.

20 Claims, 10 Drawing Sheets

(56) References Cited

U.S. PATENT DOCUMENTS

2012/0180878 A1    7/2012  Greenwood et al.
2020/0407945 A1*  12/2020  Okada .................... E02F 9/268

FOREIGN PATENT DOCUMENTS

| EP | 0 404 271 A1 | 12/1990 |
| EP | 1 338 802 A2 | 8/2003 |
| EP | 3 447 314 A1 | 2/2019 |
| FR | 2 497 851 A1 | 7/1982 |
| GB | 2 440 610 A | 2/2008 |
| IT | 102017000096057 A1 | 2/2019 |

OTHER PUBLICATIONS

European Search Report corresponding to European Patent Application No. EP 20153777.6, dated Jul. 16, 2020 (11 pages).

* cited by examiner

NON-RETURN VALVE SYSTEM WITH ELECTRONIC CONTROL

This application claims priority under 35 U.S.C. § 119 to patent application no. IT 10 2019 000 002 599, filed on Feb. 22, 2019 in Italy, the disclosure of which is incorporated herein by reference in its entirety.

The subject matter of the disclosure is a valve system for actuators or hydraulic cylinders, which comprises a valve unit.

The system is particularly suitable for machines such as excavators, lifting equipment, which have to conform to regulations in relation to the bursting or rupture of a pipe for supplying the pressurized fluid.

BACKGROUND

A similar valve unit is known from the technical description "Compact Excavator Pipe-Rupture Valve—Series CFS" by the company Bucher Hydraulics (Reference Number: 300-P-9050076-E-03/11.2009). This valve unit is fastened directly to a cylinder on any other hydraulic actuator by a second port. A pipe or hose is connected to a first port, wherein the pipe or the hose is connected to a pressurized fluid source. The third port is connected to a tank. If the pipe ruptures or the hose bursts, the first valve seat is closed in a fluid-tight manner by a first piston. During normal operation, the position of the piston can be constantly regulated by a pressure for hydraulic control, which acts on the pilot valve, so that the movement of the cylinder or the actuator can be controlled.

Document DE 10 2014 204 070 A1 presents a valve unit, which has structural similarities to the valve unit pertaining to the disclosure. The first piston likewise has a first opening and a control chamber. The first piston is connected in a different manner to the first and second port and to the pilot valve. Therefore, this valve unit does not have the functionality discussed above, which is vital according to the disclosure. Patent application IT 10 2017 000 096 057 describes a valve unit which has the advantage that it can be controlled directly by an electric current. Therefore, its design is significantly simpler than that of the existing valve unit by Bucher. The movement of the cylinder can be controlled in a very precise manner. The valve unit is very compact. Moreover, the first piston, in the event of a rupture of a pipe or a hose, remains open when a corresponding control current is delivered to the valve unit. If such a rupture occurs in particular during the movement of the actuator, the speed of the actuator only increases to an irrelevant extent and does not double regardless of the operating conditions.

According to the above-mentioned application, a core is present which is at least partially surrounded by a coil, wherein a fluid flow from the control chamber to the first port can be regulated by an electric current in the coil. The above-mentioned fluid flow can preferably be regulated in a continuous manner. The valve unit is suitable for use with a pressurized fluid, which is preferably a liquid and even more preferably a hydraulic oil.

The valve unit according to the prior art enables good control of the movement since a control current is used. However, there is no information as to how the control of the control current is to be implemented, whereas precise control would be desirable, particularly in the event of a rupture of the pipe.

SUMMARY

The problems outlined above are now solved according to the present disclosure by a valve system, which comprises a valve unit, which is provided with a housing, which has a first valve seat, which is closable by a first movable piston, wherein the housing has a first and a second port, wherein the first port is connected in a fluid-conducting manner to the second port by the first valve seat, wherein the pressure at the first port presses the first piston away from the first valve seat, wherein the first piston delimits a first opening, which can be constantly regulated by a movement of the first piston, wherein the first piston delimits a control chamber, wherein the pressure in the control chamber presses the first piston against the first valve seat, wherein the second port is connected in a fluid-conducting manner to the control chamber by the first opening, a valve unit, in which a core is present, which is at least partially surrounded by a coil, wherein a fluid flow from the control chamber to the first port can be regulated by an electric current in the coil, wherein the system is characterized in that it comprises a logic unit, which is suitable for receiving signals from at least one sensor, in particular a pressure sensor, inertia detector, position sensor, and for regulating the electric current in the coil.

According to a preferred aspect, the logic unit is suitable for receiving signals from a device for inputting commands by a user, in particular a manual command, for example a joystick.

The logic unit is suitable for regulating the current as a result of the data of the sensor and the device for inputting commands. It can be, for example, a CPU, a CAN bus or any type of machine which is suitable for processing signals and emitting an output signal, in particular the control current of the coil.

The logic unit can be external or, according to a particular aspect of the disclosure, it can be integrated in the valve unit. This also applies to the sensors, which can be of a known type and are created such that they generate a signal, for example an electrical signal, which can be read by the logic unit, since they are complete with transductors integrated in the sensor. For example, pressure sensors can be integrated in the valve unit and also (direct or indirect) position sensors of the valve members. Position sensors (for example optical or mechanical) or inertia detectors (for example dynamometric) can be mounted in a known manner on the cylinder or on the actuator or generally on the mechanical members of the machine which comprises the cylinder or actuator.

A second valve seat is preferably present, which is closable by a second movable piston, wherein the second piston is coupled to the core, wherein the second piston is pressed against the second valve seat by a spring, wherein the movement of the second piston can be constantly regulated by the electric current in the coil, wherein a third valve seat is present, which is closable by a third movable piston, wherein a first flow path of the fluid from the control chamber through a second opening, further through the second valve seat to the first port is present, wherein a second flow path of the fluid from the control chamber through the third valve seat to the first port is present, wherein the second flow path bypasses the second valve seat so that the third valve seat is not part of the first flow path, wherein the pressure between the second opening and the second valve seat presses the third piston against the third valve seat, wherein the second valve seat is situated at the third piston, wherein the second and third valve seat are situated on opposite sides of the third piston. Consequently, the first valve seat remains open when an electric current flows through the coil. The open region at the first valve seat depends mainly on the above-mentioned current and is virtually independent of the pressures at the first and second port. If the hose or the pipe ruptures in particular at the level of the first port so that a sudden drop in pressure occurs at the first port, the first piston only moves to an insubstantial extent. In no event does the actuator connected to the second port double its speed. A fixed connection between the core and the second piston is preferably present so that the two above-mentioned parts move in a synchronous manner.

The first piston preferably delimits a third opening, which can be constantly regulated by a movement of the first piston, wherein the third opening is situated between the first port and the first valve seat in relation to the fluid flow, wherein the open region of the third opening increases when the first piston is removed from the first valve seat. The first valve seat guarantees that the flow can be closed in a fluid-tight manner between the first and the second port. The characteristic line of the corresponding open region can be regulated by means of the third opening.

The first piston preferably has a tubular end portion, wherein the third opening is delimited by at least one radial bore in the tubular end portion, wherein the first opening is delimited by at least one lug on a circumferential surface of the first piston. A plurality of radial bores and/or a plurality of lugs are preferably present. This configuration is simple in design and cost effective. The at east one radial bore and the at least one lug are preferably situated on opposite sides of the first valve seat.

A fourth valve seat is preferably present, which is closable by a movable closure body, wherein the fourth valve seat is part of the first flow path of the fluid and also the second flow path of the fluid, wherein the movable closure body and the third piston have opposite opening directions in relation to the fluid flow. The closure body is preferably a ball. The configuration corresponding to document DE 10 2014 204 070 A1 is only suitable for one flow direction, specifically from the first to the second port. The valve unit is typically used with two flow directions. With a flow from the second port to the first port, the above-mentioned cylinder or actuator is typically lowered under an external force, such as the gravitational force. In this case, the pilot valve controls the speed of the movement. If the flow flows from the first port to the second port, the pilot valve is deactivated by the closed fourth valve seat. Consequently, the first position is brought into its completely open position. The through-flow quantity from the first port to the second port is typically controlled by a further valve, which is connected to the value unit according to the disclosure by a hose or a pipe whereof a rupture is made safe by the valve unit.

The fourth valve seat is preferably situated between the third valve seat and the first port in relation to the fluid flow. At this point, it is easy to seat the fourth valve seat in the first and second flow path of the fluid.

A third port and a pressure limiting valve are preferably present, which pressure limiting valve opens a fluid connection from the control chamber to the third port when the pressure at the second port exceeds a predetermined value, wherein the control chamber is connected in a fluid-conducting manner to the second port by a non-return valve, which only enables a flow from the control chamber to the second port. This feature is known from the Bucher valve unit, which was explained above. The second port is protected against excessive pressure by the opening of the first valve seat using the pressure limiting valve.

The characteristic line of the open region of the first opening in relation to the position of the first piston preferably has a first portion which begins at the closed first valve seat, wherein it increases linearly from zero with a first slope, wherein it continues through a second portion, which increases linearly with a second slope, wherein the value of the second slope is at least double, preferably four times, that of the first slope. Thanks to this configuration, it is possible to achieve very precise control of the movement at reduced speeds.

The housing preferably has a fourth port, which is connected in a fluid-conducting manner to the second port by a fourth opening, wherein a fluid connection between the fourth port and the third port is closable by a threaded plug. In the event of a rupture of the pipe or the hose, the cylinder can be lowered by an outer valve at the fourth port and/or by unscrewing the threaded plug.

The housing preferably has a first, a second and a third outer surface, which are flat and mutually orthogonal in pairs, wherein the first port is situated on the first outer surface, wherein the second port is situated on the second outer surface, wherein the first piston is movable perpendicularly to the first outer surface, wherein the second and the third piston are movable perpendicularly to the third outer surface. The corresponding housing has proven to be very compact and is simple in design. The third and/or the fourth port are preferably situated on the third outer surface.

The features mentioned above and those which will be explained below can be used not only in the particular combination described but likewise in other combinations or in an independent form without deviating from the scope of the protection.

BRIEF DESCRIPTION OF THE DRAWINGS

The disclosure will be explained in more detail below, with reference to the accompanying drawings, wherein.

DETAILED DESCRIPTION

Figure 1:
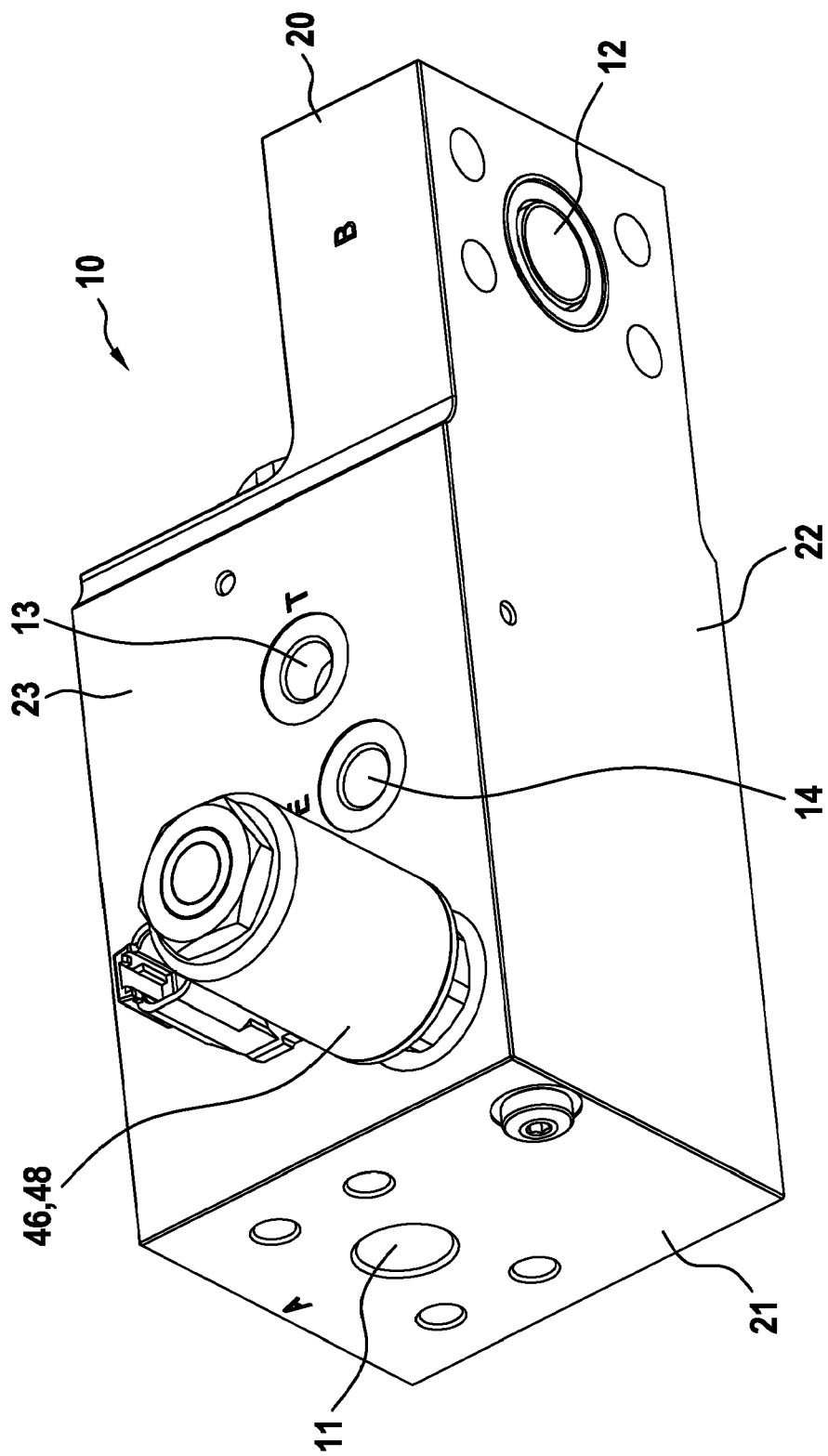
FIG. 1 represents a perspective view of a valve unit, which is part of a system according to the present disclosure.

FIG. 1 represents a perspective view of a valve unit 10, which is analogous to the valve unit already described in IT 10 2017 000 096 057. The valve unit 10 has a housing 20, which is provided with a first, a second and a third outer surface 21; 22; 23, which are flat and mutually orthogonal in pairs. Looking onto the third outer surface 23, the housing has an L-shaped profile. The housing 20 is made from aluminum or cast iron. A first port 11, to which a hose or pipe is connectable, is present on the first outer surface 21. A second port 12, to which a hydraulic actuator, in particular a hydraulic cylinder, is connectable is present on the second outer surface 22. It is preferred if the second port 12 is connected directly to the hydraulic actuator, and it is optimal if the second outer surface 22 lies against the hydraulic actuator. A third and a fourth port 13; 14 are present on the third outer surface 23. The third and the fourth port 13; 14 are each bores, which pass through the entire housing 20 orthogonally to the third outer surface 23, wherein they are closed by a threaded plug on the opposite side (not visible in FIG. 1) of the housing 20.

A pilot valve 48 is present, which is designed as a cartridge valve. It is screwed into a corresponding bore in the third outer surface 23 so that only the part with the coil 46 is situated outside the housing 20.

Figure 2:
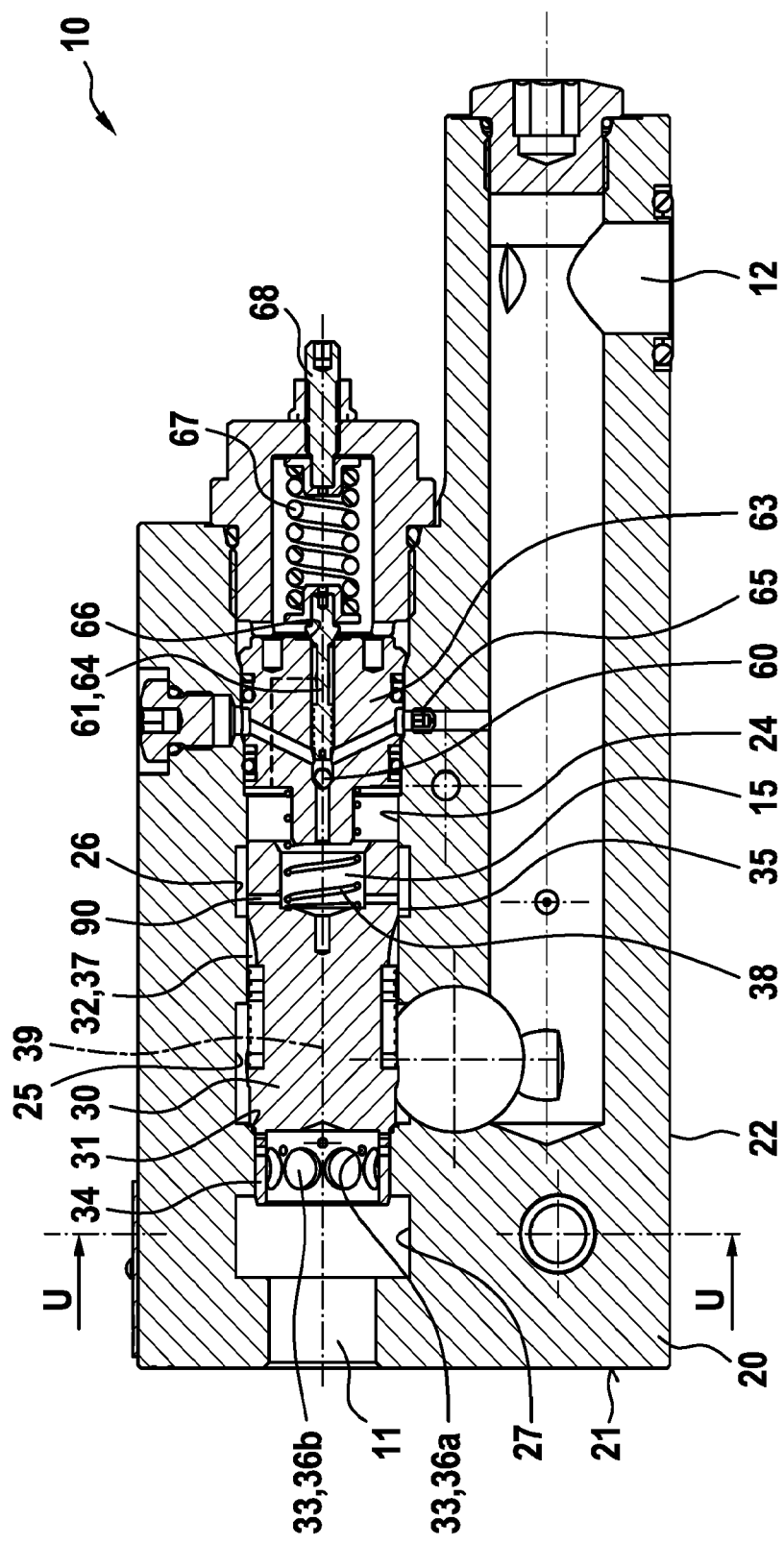
FIG. 2 represents a cross-sectional view of the valve unit according to FIG. 1, wherein the section plane passes through the center line of the first piston.

FIG. 2 represents a cross-sectional view of the valve unit 10 according to FIG. 1, wherein the section plane passes through the center line 39 of the first piston 30, wherein it is parallel to the third outer surface (No. 23 in FIG. 1).

The first piston 30 is received in a first bore 24 of the housing 10, in which it is linearly movable. The first bore 24 defines a first valve seat 31, which is preferably designed as an annular edge, which surrounds the center line 39 of the first piston 30. The diameter of the first valve seat 31 is a certain amount smaller than the diameter of the first bore 24, so that the pressure at the second port 12 presses the first piston 30 away from the valve seat 31. The corresponding fluid connection is denoted by the reference numeral 94 in FIG. 7. If, in particular, the first pressure limiting valve 61 opens, the first piston 30 is removed from the valve seat 31. Under different operating conditions, the pressure in the control chamber 15 exerts a greater force on the first piston 30 compared to the pressure at the second port 12. The hydraulically effective region of the first piston 30 in relation to the pressure at the first port 11 is approximately four times the hydraulically effective region of the first piston 30 in relation to the pressure at the second port 12. The first valve seat 31 is closable by the first piston 30, preferably by a conical cross-section of the first piston 30. The first port 11 is defined by an open end of the first bore 24 so that the pressure at the first port 11 presses the first piston 30 away from the first valve seat 31. The corresponding fluid connection is denoted by the reference numeral 95 in FIG. 7.

The first piston 30 has a tubular end portion 34, which is aligned towards the first port 11. The tubular end portion 34 has a first and a second radial bore 36a; 36b, which form a third opening 33, wherein the third opening 33 is furthermore delimited by a control edge on the housing 20. The third opening 33 is situated between the first port 11 and the first valve seat 31 in the flow path of the fluid from the first to the second port 11; 12. The combined resistance of the fluid flow of the third opening and the first valve seat 31 is explained below with reference to FIG. 6.

The first bore 24 has a first annular channel 25, which is connected in a fluid-conducting manner to the second port 12, preferably by at least one bore in the housing 20. The first annular channel 25 surrounds the first piston 30 so that the first and the second port 11; 12 are connectable in a fluid-conducting manner by the first valve seat. The first piston 30 delimits a control chamber 15, wherein the first valve seat 31 and the control chamber 15 are situated on opposite sides of the first piston 30. The pressure in the control chamber 15 presses the piston against the first valve seat 31. The housing 20 has a second annular channel 26, which surrounds the first piston 30. The second annular channel 26 defines a control edge of a first regulable opening 32. The first opening 32 is furthermore delimited by the lugs 37 on the circumferential surface 35 of the first piston 30, which are parallel to the center line 30 of the first piston 30. The open region of the first opening 32 increases when the first piston 30 is removed from the first valve seat 31, wherein further details are explained below with reference to FIG. 5. The first opening 32 is situated between the first and the second annular channel 25; 26. The second annular channel 26 is connected to the control chamber 15 by second bores 90 in the first piston 30, so that the second port 12 is connected to the control chamber 15 by the first opening 32.

The control chamber 15 is furthermore delimited by the housing 20 and by a separate insert part 63, which is fastened inside the first bore 24. A spring 38, preferably a helical spring, which presses the first piston 30 against the first valve seat 31, is present between the insert part 63 and the first piston 30. The insert part 63 receives a non-return valve 60 and a pressure limiting valve 61. The non-return valve 60 is created by a separate ball and a valve seat on the insert part 63. It only enables a fluid flow from the control chamber 15 to the second port 12. A fifth opening 65, which has a defined fixed flow resistance, is present in this flow path of the fluid, wherein said opening is preferably created by a separate part which is screwed in the insert part 63.

The pressure between the non-return valve 60 and the fifth opening 65 acts on a slide element 64 of the pressure limiting valve 61 in an opening direction of a corresponding seat valve 66, which is created by the sliding element 64 and the insert part 63. The sliding element 64 is pressed in the opposite direction by a spring 67, whereof the pre-tension can be regulated by a screw 68. Consequently, the opening pressure of the pressure limiting valve 61 can be regulated by the screw 68. The control chamber 15 is connectable in a fluid-conducting manner to the third port (No. 13 in FIG. 1) by the seat valve 66. A corresponding channel is preferably present in the insert part 63, which is denoted by a dashed line in FIG. 2.

Figure 3:
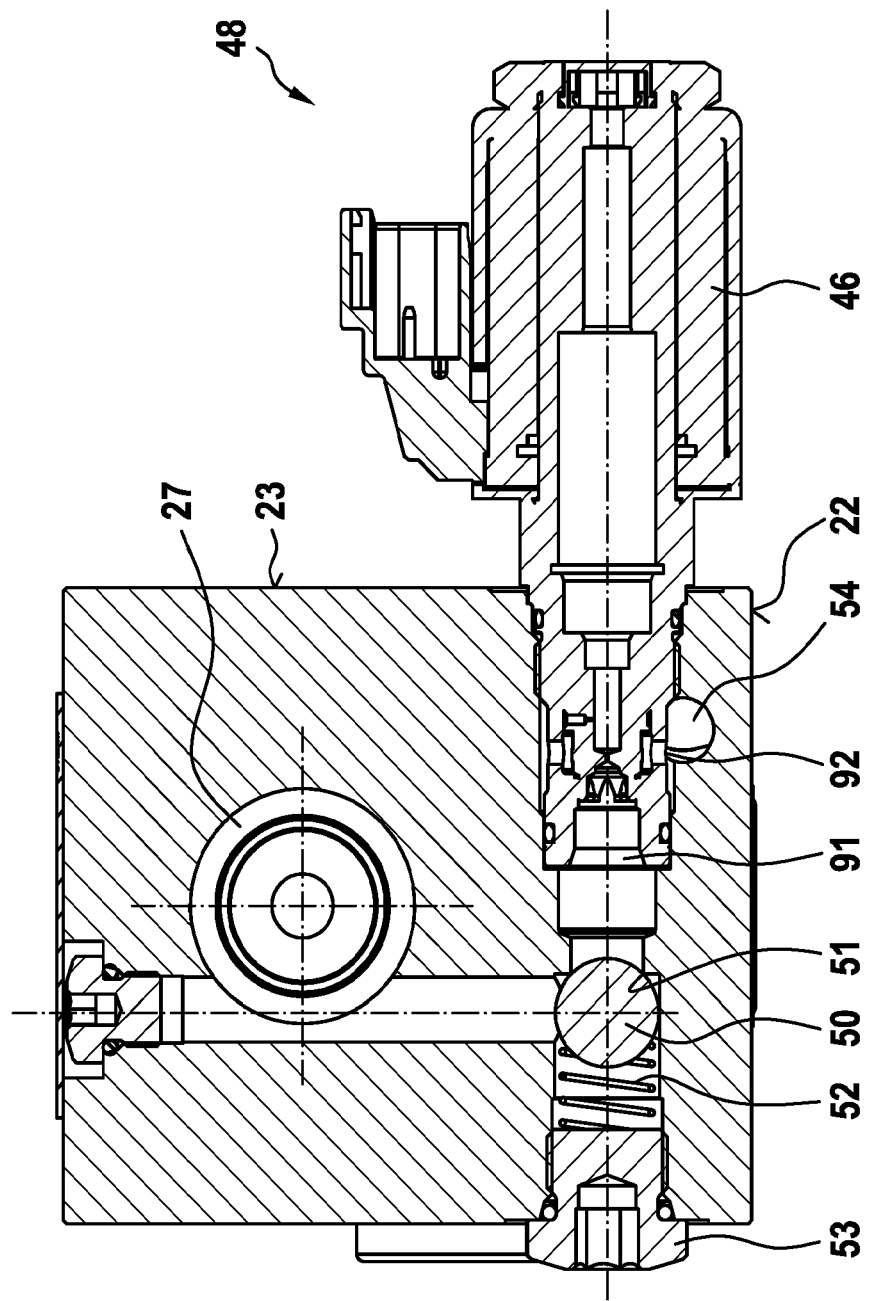
FIG. 3 represents a further cross-sectional view of the valve unit according to FIG. 1, wherein the section plane is denoted by U-U in FIG. 2.

FIG. 3 represents a further cross-sectional view of the valve unit 10 according to FIG. 1, wherein the section plane is denoted by U-U in FIG. 2. The pilot valve 48 is represented in a simplified manner, wherein FIG. 4 represents further details of the pilot valve 48.

A flow path of the fluid from the control chamber (No. 15 in FIG. 2) through the pilot valve 48, further through a fourth valve seat 51 to a third annular channel 27 (see likewise FIG. 2) of the first bore (No. 24 in FIG. 2) is present. The first port (No. 11 in FIG. 2) is connected directly to the third annular channel 27.

The fourth valve seat 52 is closable by a closure body 50, which is designed as a ball. The closure body 50 is mounted in the housing 20 through an opening, which housing is closed by a threaded plug 53. A spring 52, preferably a helical spring, which presses the closure body 50 against the fourth valve seat 51, is present between the threaded plug 53 and the closure body 50. The closure body 50 only enables a fluid flow from the pilot valve 48 to the first port (No. 11 in FIG. 2), but not in the opposite direction.

Figure 4:
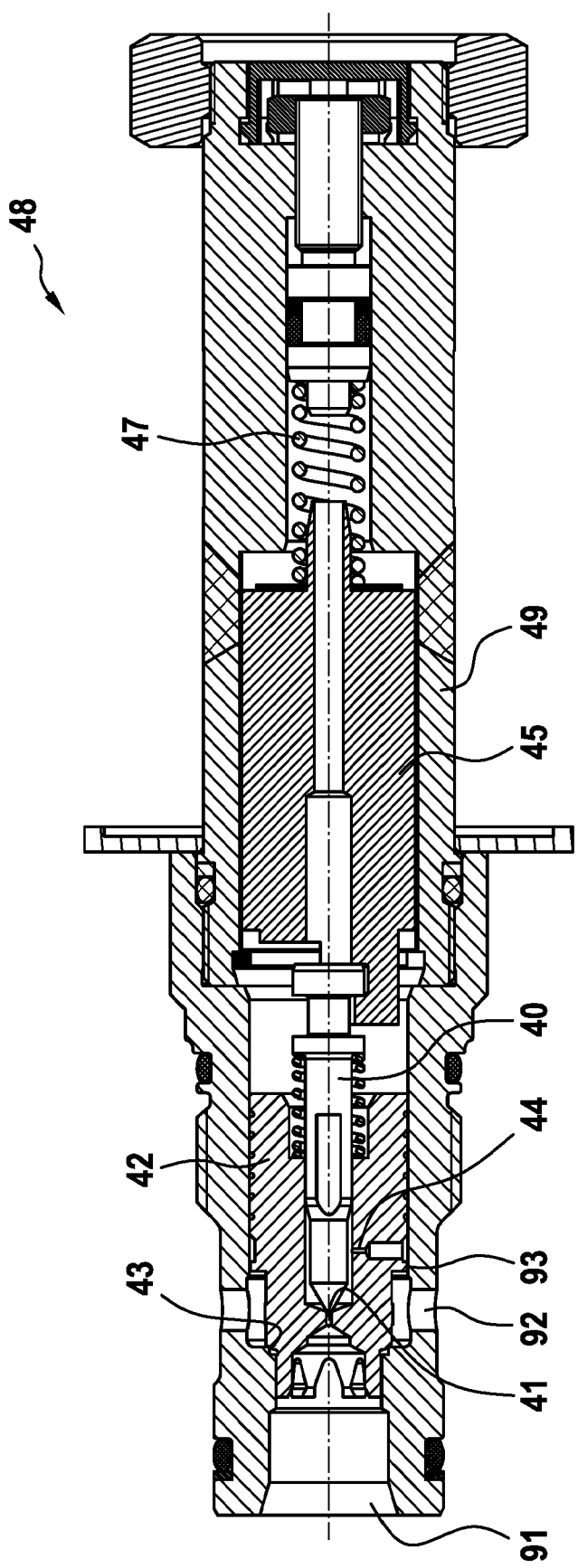
FIG. 4 represents a cross-sectional view of the pilot valve without a coil.

The pilot valve 48 is designed as a cartridge valve, wherein it has a coil 46, which can exert a magnetic force on a core (No. 45 in FIG. 4).

FIG. 4 represents a cross-sectional view of the pilot valve 48 without a coil (No. 46 in FIG. 3). The section plane is the same as in FIG. 3, in which it passes through the center of the pilot valve 48. The core 45 is mounted in a pipe 49 in which it is linearly movable. The pipe 49 is surrounded by an electrical coil (No. 46 in FIG. 3), so that the coil can exert a magnetic force on the core, which is directed away from the second valve seat 41. The second valve seat 41 is closable by a second piston 40, which is coupled to the core 45 so that the second piston 40 follows the movement of the core 45 at a ratio 1:1. A spring 47 is present, which presses the second piston 40 against the second valve seat 41.

The second valve seat 41 is situated on a third movable piston 42. The pilot valve 48 has a third valve seat 43, which is closable by the third piston 42. The third valve seat 43 and the second valve seat 41 are situated on opposite sides of the third piston 42. The pilot valve 48 has a fifth port 91, which is situated on its end face, and a sixth port 92, which is situated on its circumferential surface. The fifth port 91 is connected in a fluid-conducting manner to the first port by the fourth valve seat (No. 51 in FIG. 3). The sixth port 92 is connected to the control chamber (No. 15 in FIG. 2). A first and a second flow path of the fluid, which are parallel, are present in the pilot valve 48. The first flow path of the fluid runs from the sixth port 92 through a second opening 44, further through the second valve seat 41 to the fifth port 91. The second opening 44 has a fixed flow resistance, wherein it is generated by a bore in the third piston 42. The first flow path of the fluid extends along a reduced portion through a small clearance 93 between the third piston 42 and the surrounding pilot valve 48. The second flow path of the fluid runs from the sixth port 92 through the third valve seat 43 to the fifth port 91. The second flow path of the fluid bypasses the second valve seat 41 so that the third valve seat 43 is not part of the first flow path. The pressure between the second valve seat 41 and the second opening 44 presses the third piston 42 against the third valve seat 43. The pressure at the sixth port 92 presses the third piston 42 away from the third valve seat. Consequently, the third piston 42 follows the movement of the second piston 40. The hydraulically effective diameter of the second valve seat 41 is smaller than the hydraulically effective diameter of the third valve seat 43.

Figure 5:
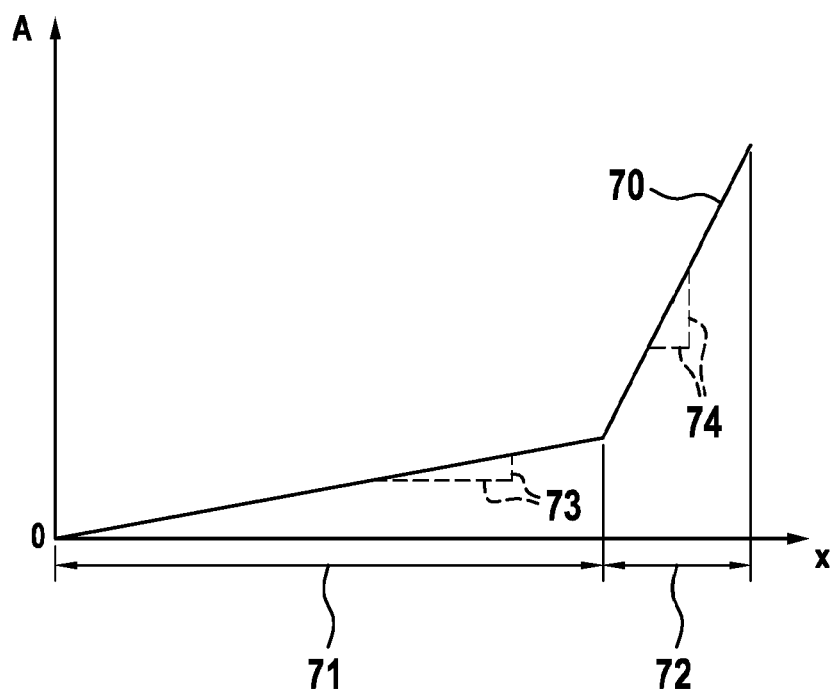
FIG. 5 represents a graph of the open region at the first opening.

FIG. 5 represents a graph of the open region at the first opening (No. 32 in FIG. 2). The vertical axis corresponds to the above-mentioned open region A. The horizontal axis corresponds to the position x of the first piston. At x=0, the first piston closes the first valve seat (No. 31 in FIG. 2). In a first portion 71 of the corresponding characteristic line 70, the open region A increases from zero with a first slope 73. The first portion 71 continues through a second portion 72, wherein the open region A of the characteristic line 70 increases further with a second slope 74. The value of the second slope 74 is at least twice, preferably four times, that of the first slope 73. In the first and in the second portion 71; 72, the characteristic line 70 has a linear behavior, to the extent that this can be achieved by a correct configuration of the lugs (No. 37 in FIG. 2) in the first piston.

Figure 6:
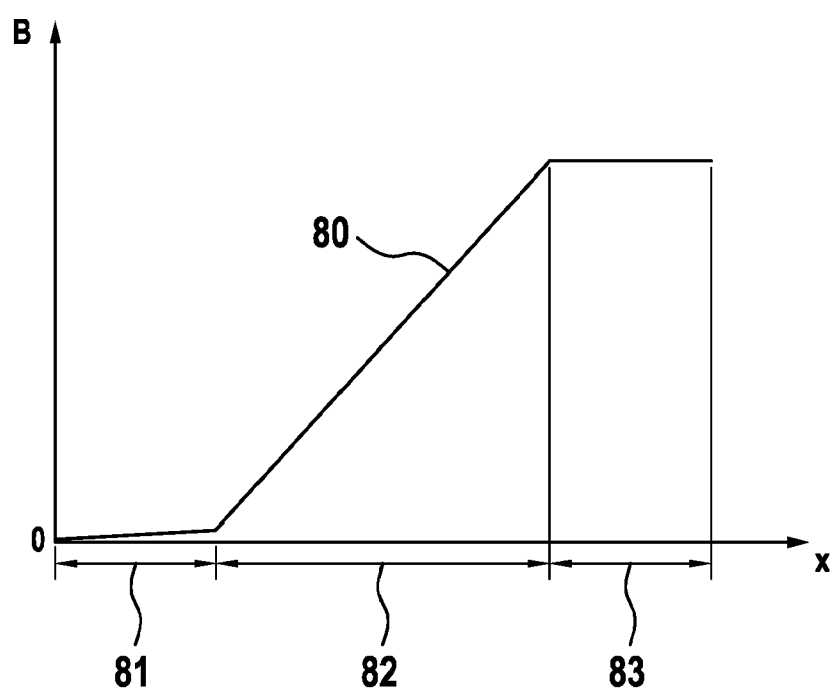
FIG. 6 represents a graph of the open region at the third opening and at the first valve seat.

FIG. 6 represents a graph of the open region B at the third opening (No. 33 in FIG. 2) and at the first valve seat (No. 31 in FIG. 2).

The vertical axis corresponds to the above-mentioned open region B, which is based on the combined effect of the third opening and the opening at the first valve seat. The horizontal axis corresponds to the position x of the first piston. At x=0, the first piston closes the first valve seat. In a first portion 81 of the corresponding characteristic line 80, the open region B is predominantly determined by the relatively small first radial bores (No. 36a in FIG. 2). The characteristic line 80 therefore increases relatively gently from zero. The first portion 81 continues through the second portion 82, wherein the open portion A is predominantly determined by the relatively large second radial bores (No. 36b in FIG. 2), wherein the first radial bores are completely open. Therefore, the characteristic line 80 increases further with a pronounced slope. In the third portion 83, the first and second radial bores are completely open, wherein only the opening at the first valve seat influences the slope of the characteristic line. Since this opening is significantly larger than the open region in the case of the first and second radial bore, the characteristic line 80 in the third portion 83 is virtually flat. In the first, in the second and in the third portion 81; 82; 83, the characteristic line 82 has a virtually linear behavior, to the extent that this is technically possible.

Figure 7:
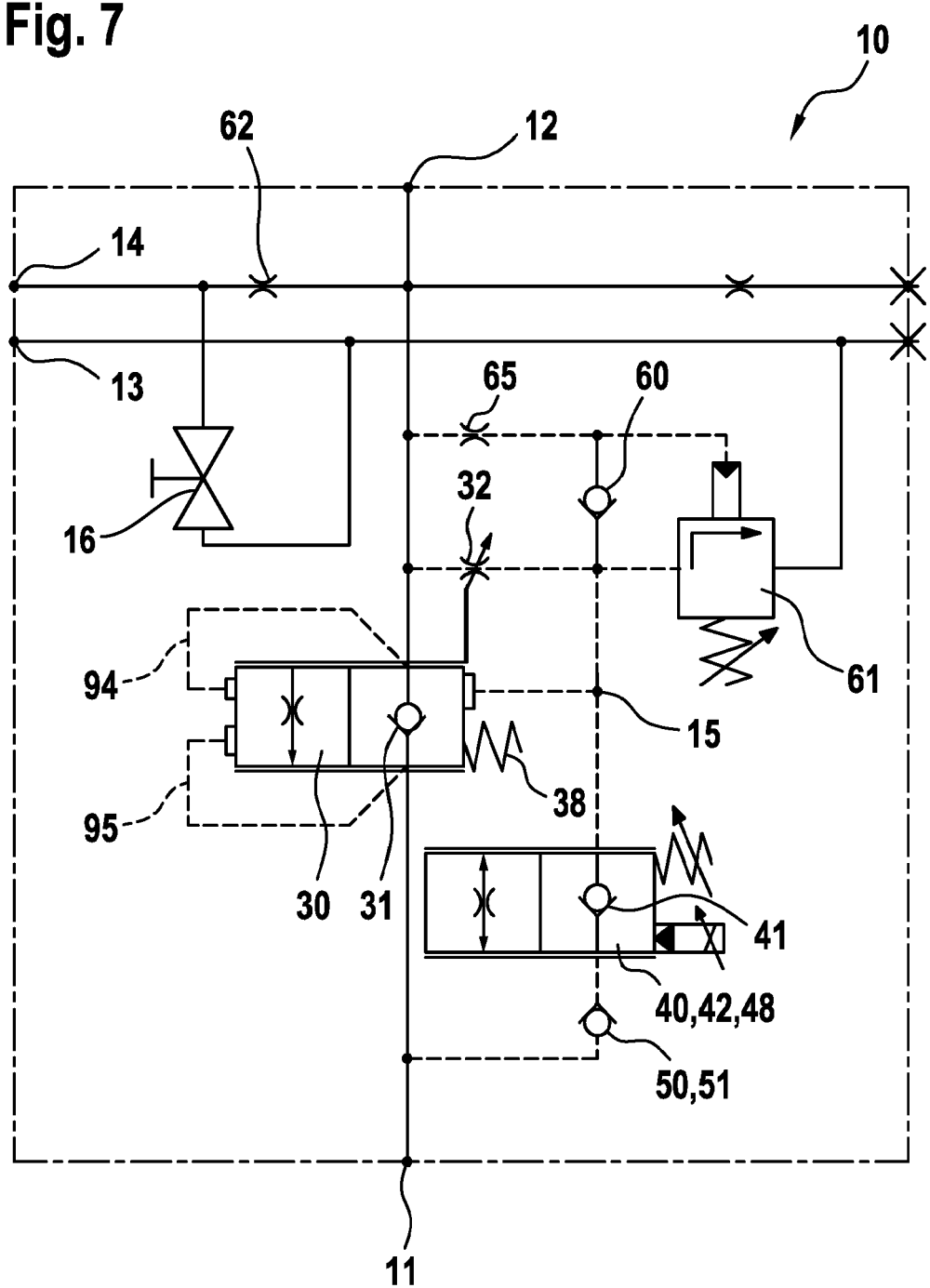
FIG. 7 represents a diagram of the valve unit according to FIG. 1.

FIG. 7 represents a diagram of the valve unit according to FIG. 1. The first opening 32 is represented as a separate symbol, wherein a connecting line to the first piston 30 is present, which indicates that the first opening 32 is defined by the first piston 30. All fluid connections are represented in this way, as described with reference to FIGS. 1 to 6.

A fourth port 14 is connected to the second port 12 by a fourth opening 62. It is possible to mount an external valve (not illustrated) at the fourth port 14. This valve is normally closed. It is only opened when the hose or the tube rupture, with the aim of moving the hydraulic actuator which is connected to the valve unit 10. It is likewise possible to close the fourth port 14 permanently. In this case, the threaded plug 16 can be unscrewed to open a fluid connection between the fourth port 14 and the third port 13. The third port 13 is typically connected to a tank.

With reference to FIG. 8-11, the system according to the present disclosure comprises a unit 10, as described above, and a logic unit, which is indicated respectively by 101, 201, 301, 401 in the various figures.

A device for inputting commands 96 of a known type can be connected to the logic unit by a transductor 97 provided for this purpose. A double-acting valve 98, likewise of a known type, can connect the fluid source 99 to the valve unit 10, as generally happens in the case of a valve unit of the known type or as described above. It can be controlled by the device 96 and can execute a compensation function of the currents according to the known behavior features.

According to a preferred aspect of the disclosure, the system, thanks to the logic unit, can function in a purely monitoring mode, in which the control of the actuator or cylinder during the controlled movement, in which the oil flows from the port 12 to the port 11, takes place via a main control outside the system, for example the pump of the fluid source 99 and the double-acting valve 98, which can be controlled directly by the device for inputting commands 96. In this mode, the logic unit holds the valve unit 10 open, preferably fully open, for example in that it supplies the coil with the maximum current, intervenes through controlled closure and only reduces the current to the minimum when the sensor detects a fault, which is linked, for example, to the rupture of the supply line or to a rupture downstream of the valve unit. The valve unit thus intervenes in a more efficient and precise manner than in the prior art.

According to a further preferred aspect, the system can function in an active control mode in which the logic unit regulates the opening of the valve unit 10 by processing the data input into the input device in order to carry out the control of the actuator or cylinder, wherein the data of the sensors are always monitored in order to intervene in the manner outlined above if a fault is detected. The system can preferably alternatively function in the two modes mentioned above depending on the requirement.

The functional diagrams outlined above are suitable for use in each of the modes.

Figure 8:
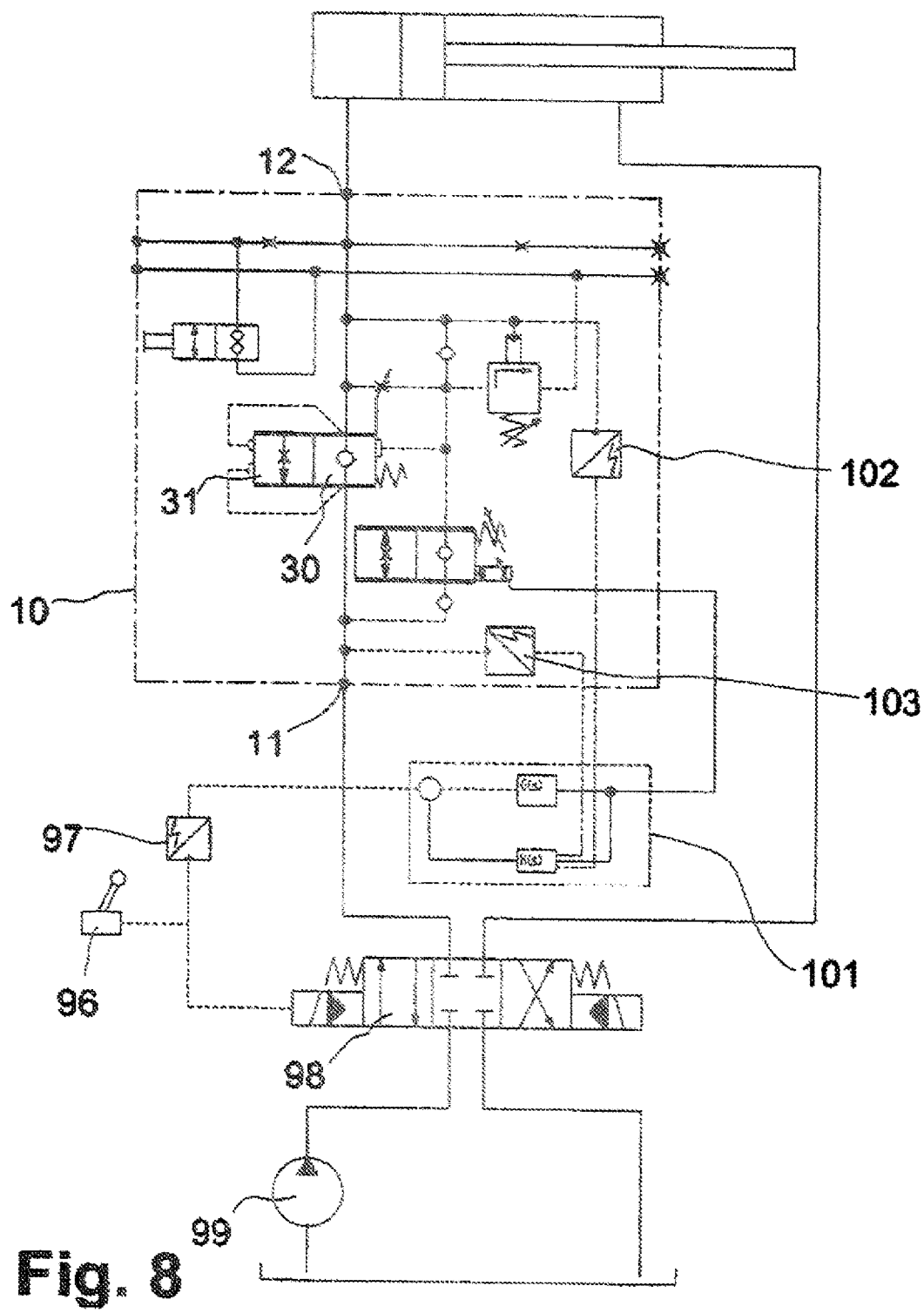
FIGS. 8, 9, 10 and 11 represent a diagram of a system according to the present disclosure, wherein a pressure control, an inertia control, a position control of the cylinder or actuator and a pressure control are carried out in each case in combination with a position control of the first piston of the valve unit.

With reference to FIG. 8, two pressure sensors 102 and 103 are present, which measure the pressure at the second port 12 and at the first 11 respectively. They can be advantageously integrated in the valve unit 10. The logic unit 101 processes the data of the sensors in that it calculates the pressure difference. Too high a difference between the port 12 and 11 can be interpreted as a rupture of the feed pipe and bring about the closure of the valve unit by the logic unit, which reduces the current to the coil 46 from the maximum or mean opening value, depending on which of the modes represented above is operative, to the minimum value, which is associated with the complete closure of the valve unit.

Figure 9:
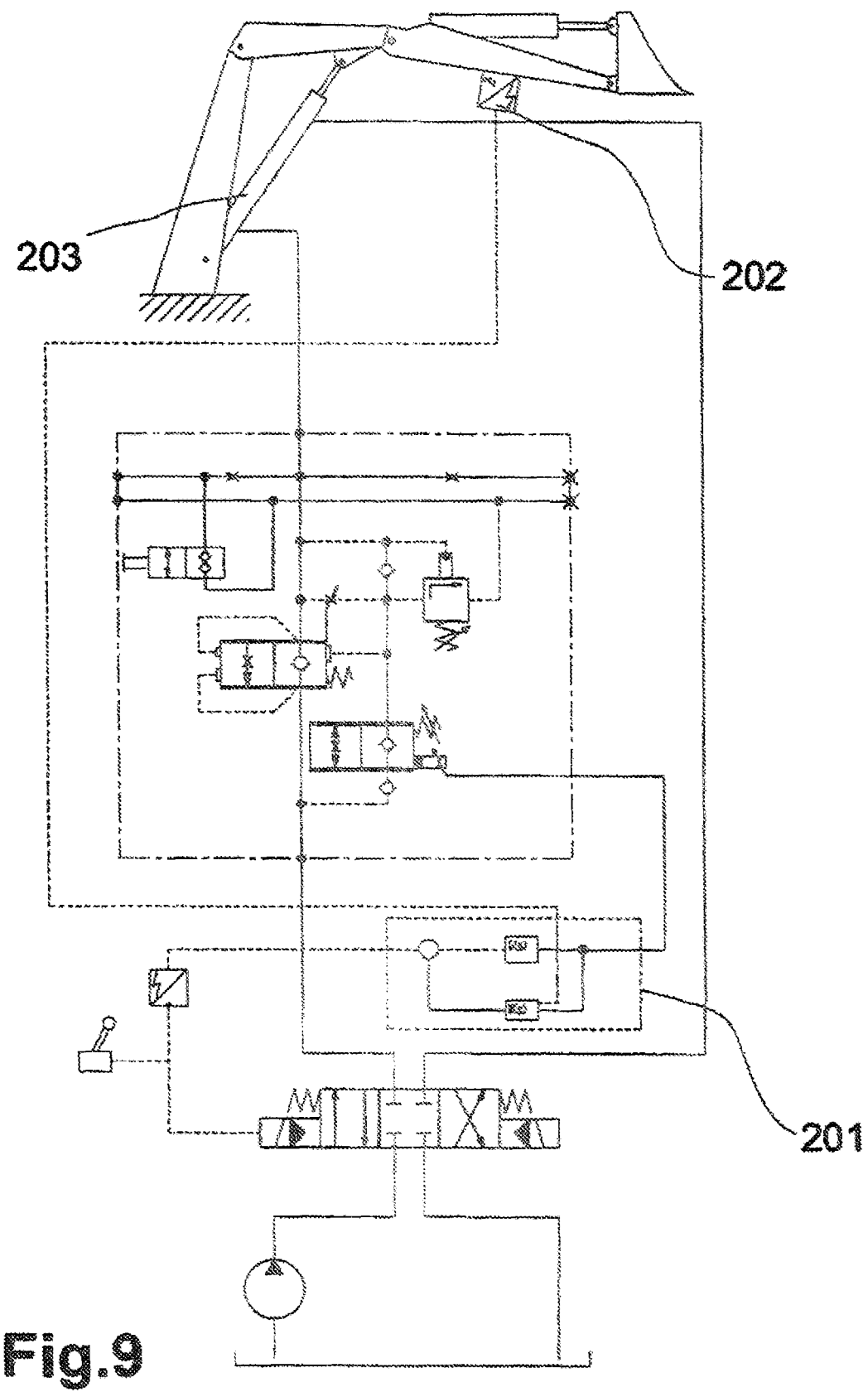

In the embodiment of FIG. 9, an inertia detector 202 is positioned accordingly on the machine 203, which is moved by the actuator or cylinder. In this case, the logic unit 201 can interpret excessive acceleration as a fault which requires the closure as above.

Figure 10:
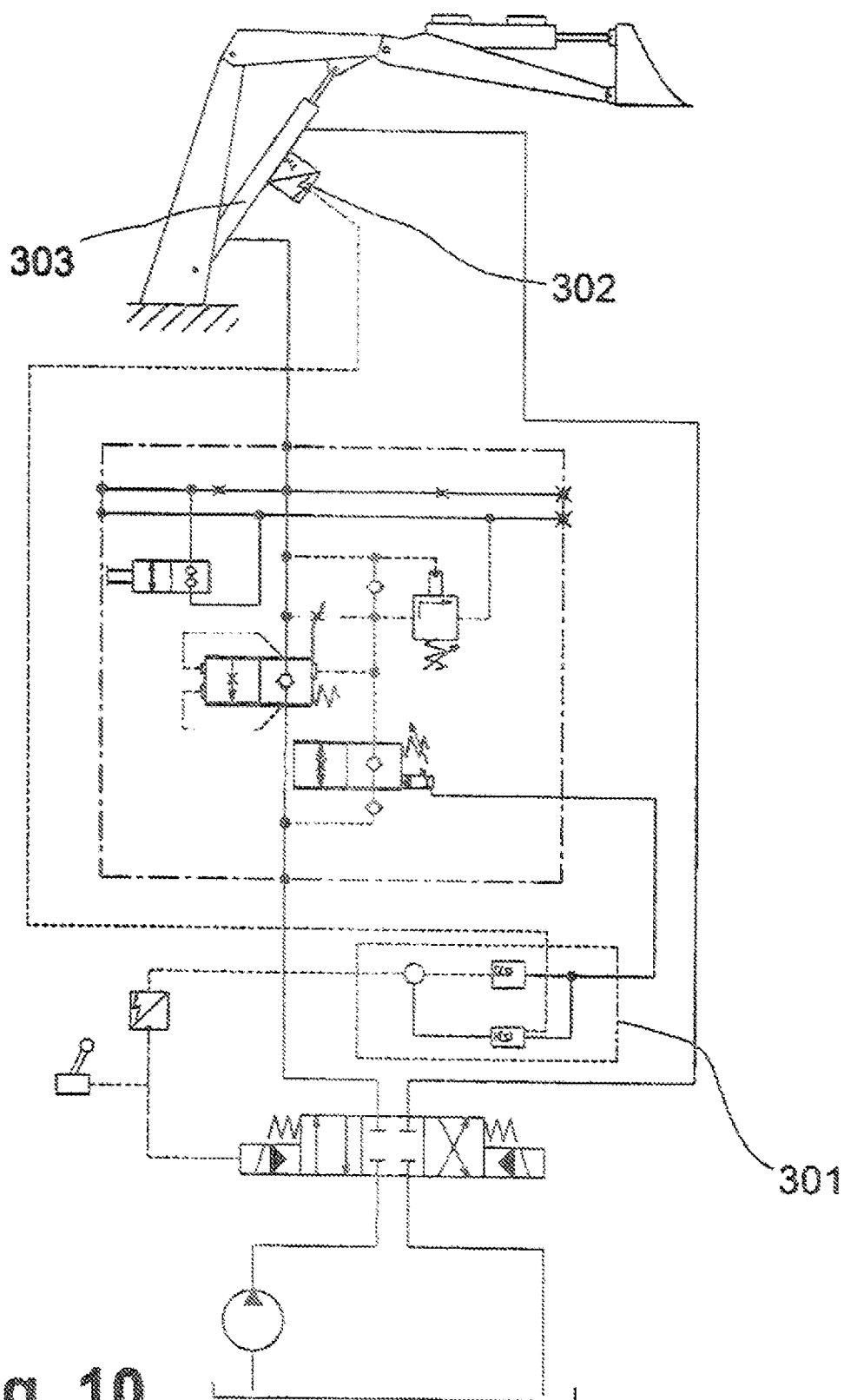

In the embodiment of FIG. 10, a position sensor 303 measures the stroke of the actuator 303 of the machine. In this case, the logic unit 301 can use the information for regulating purposes, if operating in the active control mode, and interpret an acceleration beyond a certain threshold as in the case above.

Figure 11:
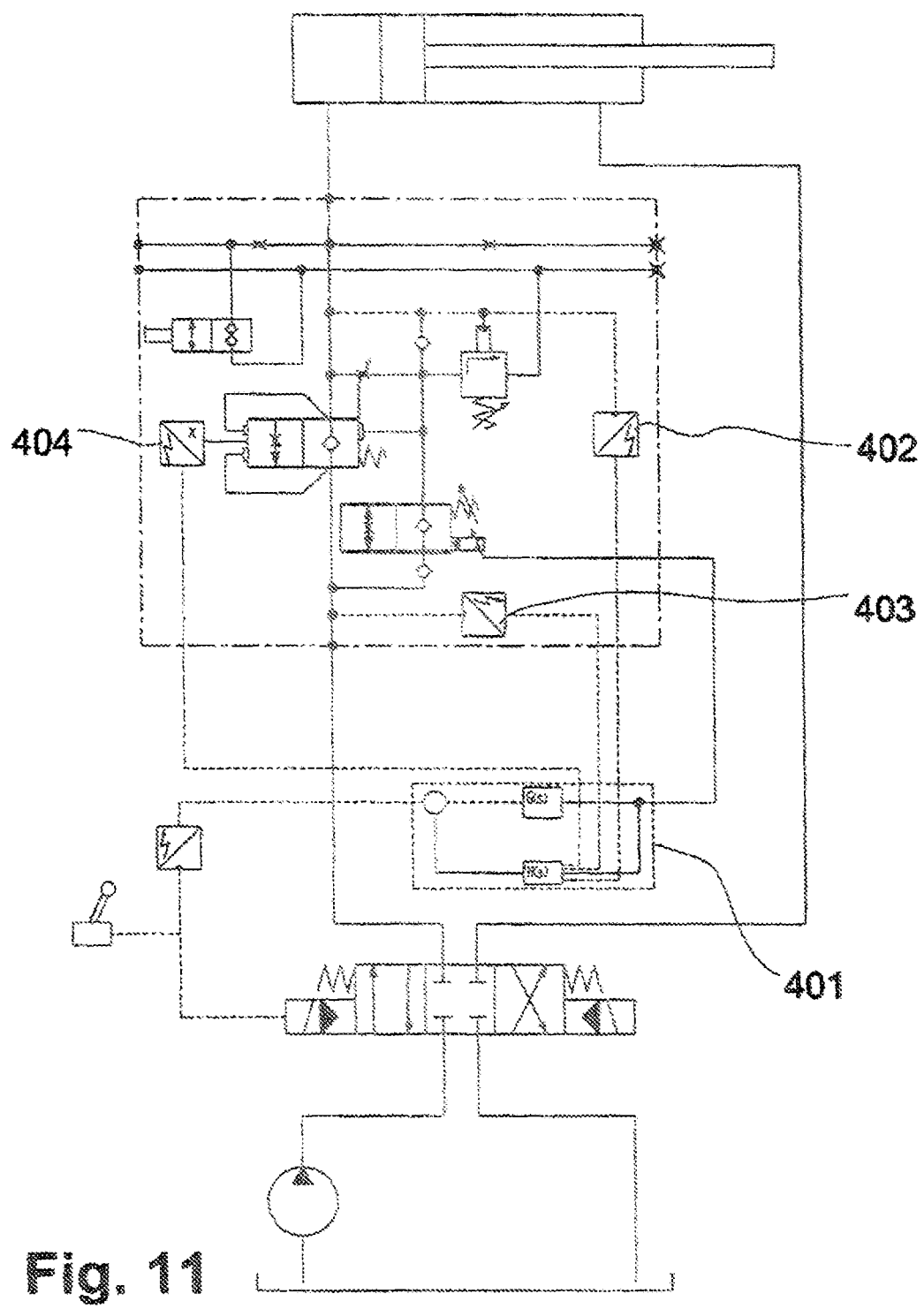

In FIG. 11, an embodiment is represented in which a position sensor 404 delivers the position of a member in the valve unit 10, preferably that of the first piston 30, which correlates to the opening of the first opening, which determines the through-flow quantity of the fluid from the second port 12 to the first 11. For this purpose, it can carry out a direct or indirect measurement, for example in that the pressure difference is measured at the first port 11 and in the control chamber 15. This type of sensor can preferably be used with other sensors of the type already seen, for example the sensor pair 402 and 403 which, as in the case of FIG. 8, measures the pressure difference between the second and first port. The addition of the position sensor 404 is, of course, advantageous if the logic unit is intended to operate in the active control mode.

Different sensor combinations can also be implemented, also in that two or more of the diagrams presented above are combined.

REFERENCE SIGNS

A open region at the first opening
B open region at the third opening and at the first valve seat
X position of the first piston
10 valve unit
11 first port
12 second port
13 third port
14 fourth port
15 control chamber
16 threaded plug
20 housing
21 first outer surface
22 second outer surface
23 third outer surface
24 first bore
25 first annular channel
26 second annular channel
27 third annular channel
30 first piston
31 first valve seat
32 first opening
33 third opening
340 tubular end portion
35 circumferential surface
36a first radial bore
26 second radial bore
37 lug
38 spring
39 center line of the first piston
40 second piston
41 second valve seat
42 third piston
43 third valve seat
44 second opening
45 core
46 coil
47 spring
47 pilot valve
49 pipe
50 closure body
51 fourth valve seat
52 spring
53 threaded plug
54 bore
60 non-return valve
61 pressure limiting valve
62 fourth opening
63 insert part
64 slide element
65 fifth opening
66 seat valve
67 spring
68 screw
70 characteristic line of the first opening
71 first portion of 70
72 second portion of 70
73 first slope
74 second slope
80 characteristic line of the third opening and the first valve seat
81 first portion of 80
82 second portion of 80
83 third portion of 80
90 second bore
91 fifth port
92 sixth port
93 clearance
94 fluid connection
95 fluid connection
96 device for inputting commands
97 transductor
98 double-acting valve
99 fluid supply
101, 201, 301, 401 logic unit
102, 103, 402, 403 position sensor
202 inertia detector
203 machine
302 position sensor
303 cylinder or actuator
404 position sensor of the member in the valve unit

The invention claimed is:

1. A valve system, comprising:
a valve unit comprising:
a movable first piston;
a housing having a first valve seat that is closable by the movable first piston so as to form a first valve, the housing defining a first port and a second port, the first port being connected in a fluid-conducting manner to the second port by the first valve, and a pressure at the first port presses the first piston away from the first valve seat, the first piston defining a first opening and being configured to constantly regulate the first opening by a movement of the first piston, the first piston delimiting a control chamber, a pressure in the control chamber pressing the first piston against the first valve seat, and the second port being connected in a fluid-conducting manner to the control chamber by the first opening; and
a second valve, which includes a core at least partially surrounded by a coil, the second valve configured to regulate a fluid flow from the control chamber to the first port with an electric current in the coil; and
a logic unit configured to:
receive signals from at least one sensor;
regulate the electric current in the coil;
receive signals from a device for inputting commands; and
during passage of fluid from the second port to the first port, alternatively function (i) in a purely monitoring mode, in which the logic unit is configured to determine a fixed opening of a passage between the second port and the first port, and (ii) in an active control mode, in which the logic unit regulates an opening of the passage as a reaction to the signals received from the device for inputting commands.

2. The system according to claim 1, wherein the at least one sensor includes a plurality of pressure sensors integrated in the valve unit and configured to measure the pressure at the first port and the pressure at the second port.

3. The system according to claim 2, wherein the at least one sensor further includes a position sensor configured to sense a position of a member in the valve unit.

4. The system according to claim 1, wherein the at least one sensor includes one of an inertia detector and a position sensor, which are associated with an actuator or cylinder or a machine which comprises the actuator or cylinder.

5. The system according to claim 1, wherein:
the first piston defines a third opening, which can be constantly regulated by the movement of the first piston,
the third opening is situated between the first port and the first valve in relation to a fluid flow path between the first port and the first valve, and
an open region of the third opening increases when the first piston is moved in a direction away from the first valve seat.

6. The system according to claim 5, wherein:
the first piston has a tubular end portion, which defines at least one radial bore that delimits the third opening, and
a circumferential surface of the first piston includes at least one lug that delimits the first opening.

7. The system according to claim 6, in which the at least one radial bore and at least one lug are situated on opposite sides of the first valve seat.

8. The system according to claim 1, wherein the at least one sensor includes at least one of a pressure sensor, an inertia detector and a position sensor.

9. The system according to claim 1, wherein the fixed opening is a maximal opening.

10. A valve system, comprising:
a valve unit comprising:
a movable first piston;
a housing having a first valve seat that is closable by the movable first piston so as to form a first valve, the housing defining a first port and a second port, the first port being connected in a fluid-conducting manner to the second port by the first valve, and a pressure at the first port presses the first piston away from the first valve seat, the first piston defining a first opening and being configured to constantly regulate the first opening by a movement of the first piston, the first piston delimiting a control chamber, a pressure in the control chamber pressing the first piston against the first valve seat, and the second port being connected in a fluid-conducting manner to the control chamber by the first opening; and
a second valve comprising:
a core at least partially surrounded by a coil, the second valve configured to regulate a fluid flow from the control chamber to the first port with an electric current in the coil;
a second valve seat, which is closable by a second movable piston that is coupled to the core, the second piston being pressed against the second valve seat by a spring, wherein movement of the second piston is constantly regulated by the electric current in the coil; and
a third valve seat, which is closable by a third movable piston; and
a logic unit configured to receive signals from at least one sensor and to regulate the electric current in the coil,
wherein a first flow path of fluid is defined from the control chamber through a second opening, further through the second valve seat to the first port,
wherein a second flow path of the fluid is defined from the control chamber through the third valve seat to the first port, the second flow path of the fluid bypassing the second valve seat, so that the third valve seat is not part of the first flow path,
wherein a pressure between the second opening and the second valve seat presses the third piston against the third valve seat,
wherein the second valve seat is situated at the third piston, and
wherein the second and third valve seats are situated on opposite sides of the third piston.

11. The system according to claim 10, wherein the logic unit is further configured to receive signals from a device for inputting commands.

12. The system according to claim 11, wherein the logic unit is further configured, during passage of fluid from the second port to the first port, to alternatively function (i) in a purely monitoring mode, in which the logic unit is configured to determine a fixed opening of a passage between the second port and the first port, and (ii) in an active control mode, in which the logic unit regulates an opening of the passage as a reaction to the signals received from the device for inputting commands.

13. The system according to claim 10, further comprising:
a fourth valve seat, which is closable by a movable closure body, the fourth valve seat arranged in the first flow path of the fluid and in the second flow path of the fluid, wherein the movable closure body and the third piston have opposite opening directions in relation to the fluid flow.

14. The system according to claim 13, wherein the fourth valve seat is arranged, in relation to the fluid flow, between the third valve seat and the first port.

15. The system according to claim 10, wherein:
the housing has a first outer surface, a second outer surface, and a third outer surface, each of which is flat and mutually orthogonal in pairs,
the first port is situated on the first outer surface, the second port is situated on the second outer surface,
the first piston is movable perpendicularly to the first outer surface, and
the second and the third pistons are movable perpendicularly to the third outer surface.

16. A valve system, comprising:
a valve unit comprising:
- a movable first piston; and
- a housing having a first valve seat that is closable by the movable first piston so as to form a first valve, the housing defining a first port and a second port, the first port being connected in a fluid-conducting manner to the second port by the first valve, and a pressure at the first port presses the first piston away from the first valve seat, the first piston defining a first opening and being configured to constantly regulate the first opening by a movement of the first piston, the first piston delimiting a control chamber, a pressure in the control chamber pressing the first piston against the first valve seat, and the second port being connected in a fluid-conducting manner to the control chamber by the first opening;
- a second valve, which includes a core at least partially surrounded by a coil, the second valve configured to regulate a fluid flow from the control chamber to the first port with an electric current in the coil;
- a pressure limiting valve configured to open a fluid connection from the first control chamber to a third port when a pressure at the second port exceeds a predetermined value; and
- a non-return valve arranged between the control chamber and the second port, the non-return valve configured to enable flow only from the control chamber to the second port; and
a logic unit configured to receive signals from at least one sensor and to regulate the electric current in the coil.

17. The system according to claim 16, wherein the housing defines a fourth port, which is connected in a fluid-conducting manner to the second port by a fourth opening, and a fluid connection between the fourth port and the third port is closable by a threaded plug.

18. A valve system, comprising:
a first valve unit comprising:
- a movable first piston;
- a housing having a first valve seat that is closable by the movable first piston so as to form a first valve, the housing defining a first port and a second port, the first port being connected in a fluid-conducting manner to the second port by the first valve, and a pressure at the first port presses the first piston away from the first valve seat, the first piston defining a first opening and being configured to constantly regulate the first opening by a movement of the first piston, the first piston delimiting a control chamber, a pressure in the control chamber pressing the first piston against the first valve seat, and the second port being connected in a fluid-conducting manner to the control chamber by the first opening; and
- a second valve, which includes a core at least partially surrounded by a coil, the second valve configured to regulate a fluid flow from the control chamber to the first port with an electric current in the coil; and
a logic unit configured to receive signals from at least one sensor and to regulate the electric current in the coil;
wherein a characteristic line of an opening region of the first opening in relation to a position of the first piston has a first portion, which begins at the closed first valve seat and increases linearly from zero with a first slope, and a second portion, which increases linearly with a second slope that is at least double the first slope.

19. The system according to claim 18, wherein the second slope is at least four times the first slope.

20. A valve system, comprising:
a first valve unit comprising:
- a movable first piston;
- a housing having a first valve seat that is closable by the movable first piston so as to form a first valve, the housing defining a first port and a second port, the first port being connected in a fluid-conducting manner to the second port by the first valve, and a pressure at the first port presses the first piston away from the first valve seat, the first piston defining a first opening and being configured to constantly regulate the first opening by a movement of the first piston, the first piston delimiting a control chamber, a pressure in the control chamber pressing the first piston against the first valve seat, and the second port being connected in a fluid-conducting manner to the control chamber by the first opening; and
- a second valve, which includes a core at least partially surrounded by a coil, the second valve configured to regulate a fluid flow from the control chamber to the first port with an electric current in the coil; and
a logic unit configured to receive signals from at least one sensor and to regulate the electric current in the coil,
wherein the at least one sensor includes a plurality of pressure sensors integrated in the valve unit and configured to measure the pressure at the first port and the pressure at the second port, and
wherein the at least one sensor further includes a position sensor configured to sense a position of the first piston in the valve unit.

* * * * *